(12) United States Patent
Marini (10) Patent No.: US 7,831,918 B2
(45) Date of Patent: Nov. 9, 2010

(54) CONTENT BASED USER INTERFACE DESIGN (75) Inventor: Cesare J Marini, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/225,289

(22) Filed: Sep. 12, 2005

(65) Prior Publication Data
US 2007/0061740 A1 Mar. 15, 2007

(51) Int. Cl.
G06F 17/25 (2006.01)
(52) U.S. Cl. ..................................... 715/762
(58) Field of Classification Search ................. 715/762
See application file for complete search history.

(56) References Cited

U.S. PATENT DOCUMENTS

| 5,999,948 | A | * | 12/1999 | Nelson et al. ............... 715/207 |
| 6,741,655 | B1 | | 5/2004 | Chang et al. |
| 6,950,831 | B2 | | 9/2005 | Haley |
| 6,961,750 | B1 | | 11/2005 | Burd et al. |
| 2003/0035595 | A1 | | 2/2003 | Liu |
| 2004/0125877 | A1 | | 7/2004 | Chang et al. |
| 2004/0169680 | A1 | | 9/2004 | Stevens et al. |
| 2004/0181543 | A1 | * | 9/2004 | Wu et al. .................... 707/102 |
| 2004/0189691 | A1 | | 9/2004 | Jojic et al. |
| 2004/0230911 | A1 | * | 11/2004 | Bent et al. .................. 715/762 |
| 2005/0055344 | A1 | | 3/2005 | Liu et al. |
| 2005/0091232 | A1 | | 4/2005 | Eschbach et al. |
| 2005/0172264 | A1 | * | 8/2005 | Yuknewicz et al. ......... 717/113 |
| 2005/0188350 | A1 | * | 8/2005 | Bent et al. .................. 717/106 |
| 2005/0228608 | A1 | * | 10/2005 | Wells ......................... 702/127 |
| 2005/0229190 | A1 | | 10/2005 | Peters et al. |
| 2006/0150172 | A1 | * | 7/2006 | Heath et al. ................. 717/162 |
| 2007/0179939 | A1 | * | 8/2007 | O'Neil et al. ................ 707/4 |

OTHER PUBLICATIONS

Egon L. van den Broek, Peter M.F. Kisters, and Louis G. Vuurpijl; Design Guidelines for a Content-Based Image Retrieval Color-Selection Interface; Nijmegen Institute for Cognition and Information, PO Box 9104, 6500 He Nijmegen, The Netherlands; retrived Nov. 24, 2005.

(Continued)

Primary Examiner—Adam L Basehoar
Assistant Examiner—Henry Orr
(74) Attorney, Agent, or Firm—Workman Nydegger (57) ABSTRACT Design of a user interface can be based on content of a data source bound to the user interface. Access can be provided to a data source having fields containing respective items of data. The items can be automatically analyzed to determine which types of user interface elements and/or properties of user interface elements to bind to the fields. Information for binding the fields with the respective determined types of user interface elements and/or the properties can be generated or stored. A user interface design tool can have data field identifiers that identify data fields of a data source. Control-type designators associated with the data fields can allow a user to designate one of a plurality control-types. Property designators associated with one of the control-type designators can be included to allow a user to designate a property of the control-type designated by a corresponding control-type designator.

7 Claims, 8 Drawing Sheets

OTHER PUBLICATIONS

Horst Eidengerger and Christian Breiteneder, A Framework for User Interface Design in Visual Information Retrieval; Vienna University of Technology, Institute of Software Technology and Interactive Systems, Favoritenstrasse 9-11-188/2, A-1040 Vienna, Austria; retrieved Nov. 24, 2005.

Dave Deniman, Tamara Sumner, Lynne Davis, Sonal Bhushan and Jackson; Merging Metadata and Content-Based Retrieval; Journal of Digital Information, vol. 4 Issue 3; Article No. 231, Nov. 6, 2003.

\* cited by examiner

RELATED ART

| Pattern of Data | Control |
|---|---|
| URL (not image) – "http://" followed by path that does not end with a known image type | Hyperlink |
| URL pointing to an image type - "http://" followed by path that ends with a known image type, like .png, .jpg, .gif, .bmp, etc. | Image |
| Text, less than 255 characters | TextBox |
| Text, more than 255 characters | RichTextBox |
| Text, only values are "true" and "false" | Checkbox or RadioButton |

```
<StackPanel
  xmlns="http://schemas.microsoft.com/winfx/avalon/2005"
  xmlns:x="http://schemas.microsoft.com/winfx/xaml/2005">

<StackPanel.Resources>
    <XmlDataSource x:Key="BookData" XPath="/Books">
      <Books xmlns="">
        <Book ISBN="0-7356-0562-9" Stock="in">
          <Title>XML in Action</Title>
          <Summary>XML Web Technology</Summary>
        </Book>
        <!-- ... other Book entries ... -->
      </Books>
    </XmlDataSource>

<DataTemplate x:Key="BookDataTemplate">
      <TextBlock FontSize="Small" Foreground="Red">
        <TextBlock.TextContent>
          <Binding XPath="Title"/>
        </TextBlock.TextContent>
      </TextBlock>
    </DataTemplate>

</StackPanel.Resources>

<ListBox
    Width="400" Height="300" Background="Honeydew"
    ItemsSource="{Binding Source={StaticResource BookData}, XPath=Book}"
    ItemTemplate="{StaticResource BookDataTemplate}"/>

</StackPanel>
```

252 points to the DataTemplate block. 250 labels the whole figure.

FIG. 8

CONTENT BASED USER INTERFACE DESIGN

BACKGROUND

In computer programming, a common design paradigm or pattern is the model-view-controller pattern. The model-view-controller pattern is used to separate the design of a user interface from the substantive content, data, or model that it represents or manipulates. Integrated Development Environments (IDEs) such as Visual Studio, Sun Java Studio Creator, and others allow programmers to design user interfaces somewhat independent of their data models.

One problem with implementing the model-view-controller pattern is the time required for a programmer to design a view or user interface that logically matches the model or data source. Previously, IDEs and other software tools for designing user interfaces have included some limited features for designing a view or user interface given a data source. For example, given a data source such as a database table, an IDE or design tool might use information describing the database table (e.g., a schema) to auto-create a number of user interface elements and associate them with fields in the database table. For example, if the data source were a table of books with fields such as author, title, etc., an IDE or layout design tool might use schematic information to auto-create textbox interface elements for the table's fields and label the interface elements based on the names of the fields. Other rudimentary techniques have been used to facilitate tailoring a user interface (control view, interactive form, web page, etc.) to a particular data source. For example, allowing fields to be dragged onto a design surface and creating interface elements in response. However, even with these types of tools, a programmer may still require significant time to tailor a user interface for a particular data source.

Another problem with implementing the model-view-control pattern is the complexity of control logic and maintaining synchronicity between the model or data source and the view with the view or user interface. This problem has been reduced with the emergence of data binding techniques. Data binding allows a data source (e.g., an XML document, a database table, etc.) to be automatically bound with a user interface, either from data source to user interface, from user interface to data source, or both. This simplifies the programming model because the programmer, for example, does not have to write code to update each user interface element with the data from the data source. Or, depending on the type of binding, the programmer may not have o write code to update the data source when the user interface elements change. The behavior of the interface and the content of the data source are linked by transparent mechanisms.

Figure 1:
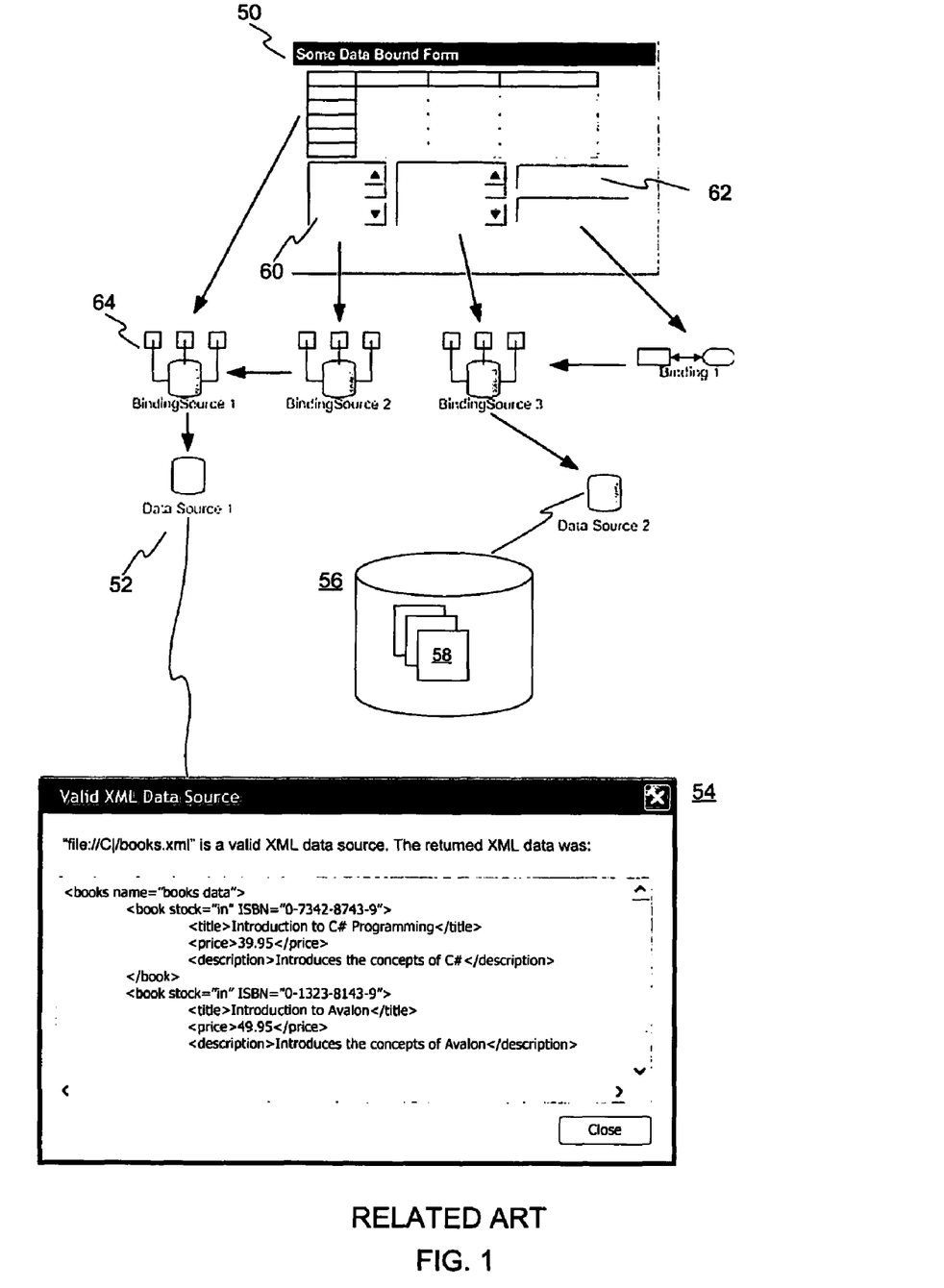
FIG. 1 shows a conceptual data binding example.

FIG. 1 shows a conceptual data binding example. A user interface or form 50 is bound to data sources 52, in this case, an XML document 54 ("books.xml") and a database 56 with tables 58. The form 50 has user interface elements such as scrolled lists 60 and textboxes 62, each of which is bound to data in a data source 52. For example, a book's title (from XML document 54) might be bound to textbox 62, such that changes to one automatically cause changes to the other. An abstraction layer of binding sources 64 helps to hide details of accessing the data sources 52. However, for purposes herein, a data source is considered to be either an actual source of data (e.g., a database, an XML document, a service provided by a server, etc.), or an object that handles or brokers access to an actual data source, or a combination thereof. Data binding is available in a number of Java and .NET development tools. Documentation on how to program a data binding tool or component is also available.

However, it can be a slow and difficult process for a programmer to tailor a user interface to a particular data source. For example, many user interface elements may need to be created, configured, and bound, element by element, to the data source. Furthermore, schema information about a data source may be needed, and changes in the configuration of the data source can require modification of the user interface.

SUMMARY

The following summary is included only to introduce some concepts discussed in the Detailed Description below. This summary is not comprehensive and is not intended to delineate the scope of protectable subject matter, which is set forth by the claims presented at the end.

Design of a user interface can be based on content of a data source bound to the user interface. Access can be provided to a data source having fields containing respective items of data. The items can be automatically analyzed to determine which types of user interface elements and/or properties of user interface elements to bind to the fields. Information for binding the fields with the respective determined types of user interface elements and/or the properties can be generated or stored. A user interface design tool can have data field identifiers that identify data fields of a data source. Control-type designators associated with the data fields can allow a user to designate one of a plurality of control-types. Property designators associated with one of the control-type designators can be included to allow a user to designate a property of the control-type designated by a corresponding control-type designator.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

DETAILED DESCRIPTION

Figure 2:
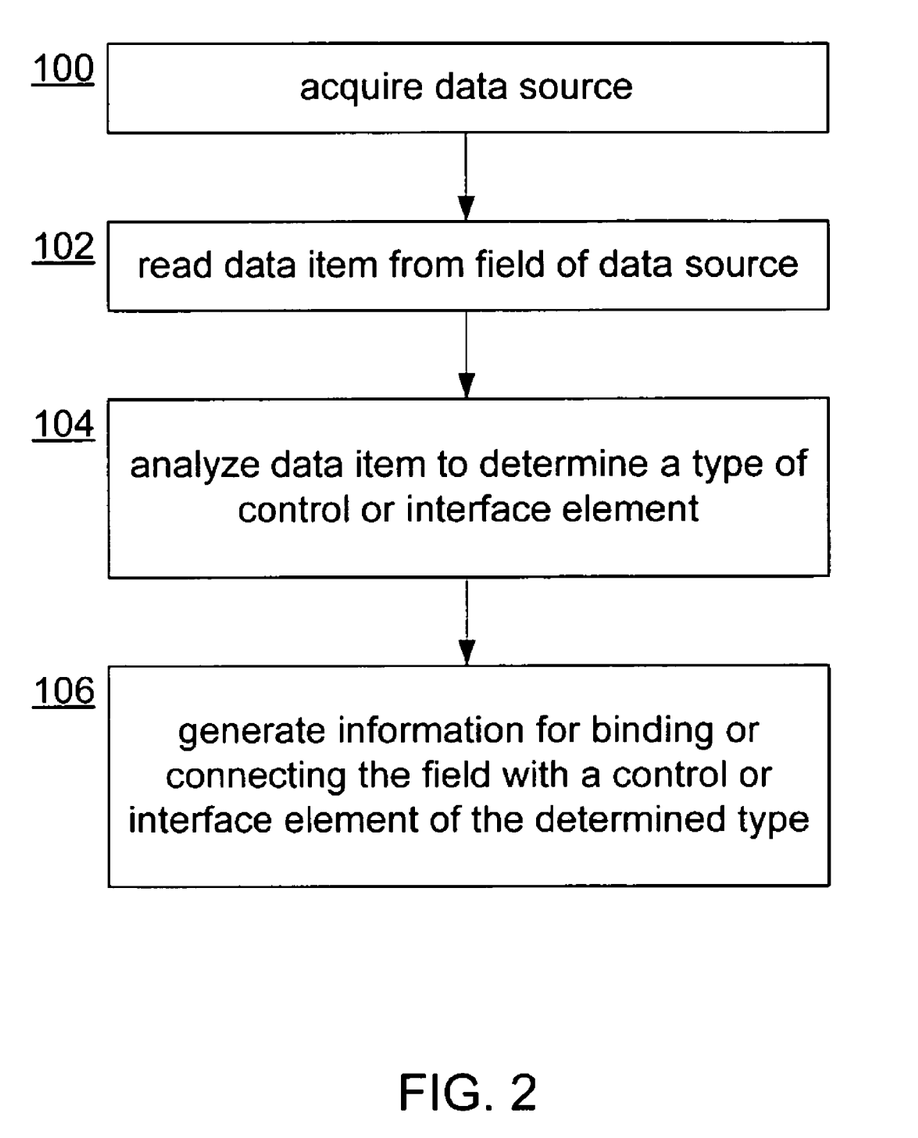
FIG. 2 shows a process for configuring user interface elements.

FIG. 2 shows a process for configuring user interface elements. The process can be performed by an IDE or user interface builder during design time, or, if needed, the process can be performed at runtime by a user application that needs to bind to a data source as soon as the data source is added. One way to improve the process of building a user interface that is to be bound to a data source is to use the content of the data source to make intelligent choices about the user interface. Often times, the data type of the fields or elements of a data source are not known. For example, if the data source is an XML document and no schema is available, then the data types of the nodes may not be known. Or, the data source might be a flat file with character-delimited columns with no available typing information. Again, even though the fields may actually carry a diverse range of data types, perhaps hyperlinks in one column, numbers in another column, and currencies in another column, by automatically inspecting the actual contents of the data it becomes possible to make intelligent automatic user interface design choices. It should be noted that content-based design choices can also be useful even when typing information is available for a data source. The data source could be a database and the data types of the columns may be known at design time. However, the data types provided by the data source may not be accurate or precise. For example, a column may be a text data type and yet the column may specifically contain hyperlinks, URLs, URIs, etc.

Referring again to FIG. 2, in one embodiment, user interface design process begins with acquiring 100 a data source. Once acquired 100, a data item or portion of content is read from a field of the data source. The data item is then analyzed 104 to determine a type of control or user interface element. For example, based on analysis 104 of the data item, the process could determine that a textbox type of user interface element is called for. There is no limit on the type of user interface element that can be determined or selected; any current or future type of control or user interface element can be chosen. Furthermore, there need not be a logical correspondence between the data item and the determined type of user interface. For example, although it might make sense to map a date-formatted data item a date-picker or some other date-specific user interface element, the data item could as easily be mapped to a textbox, or a slider, etc. Finally, the determined type of user interface element is actualized by generating 106 information for binding or connecting the field that provided the data item with a control or interface element of the determined type.

Figure 3:
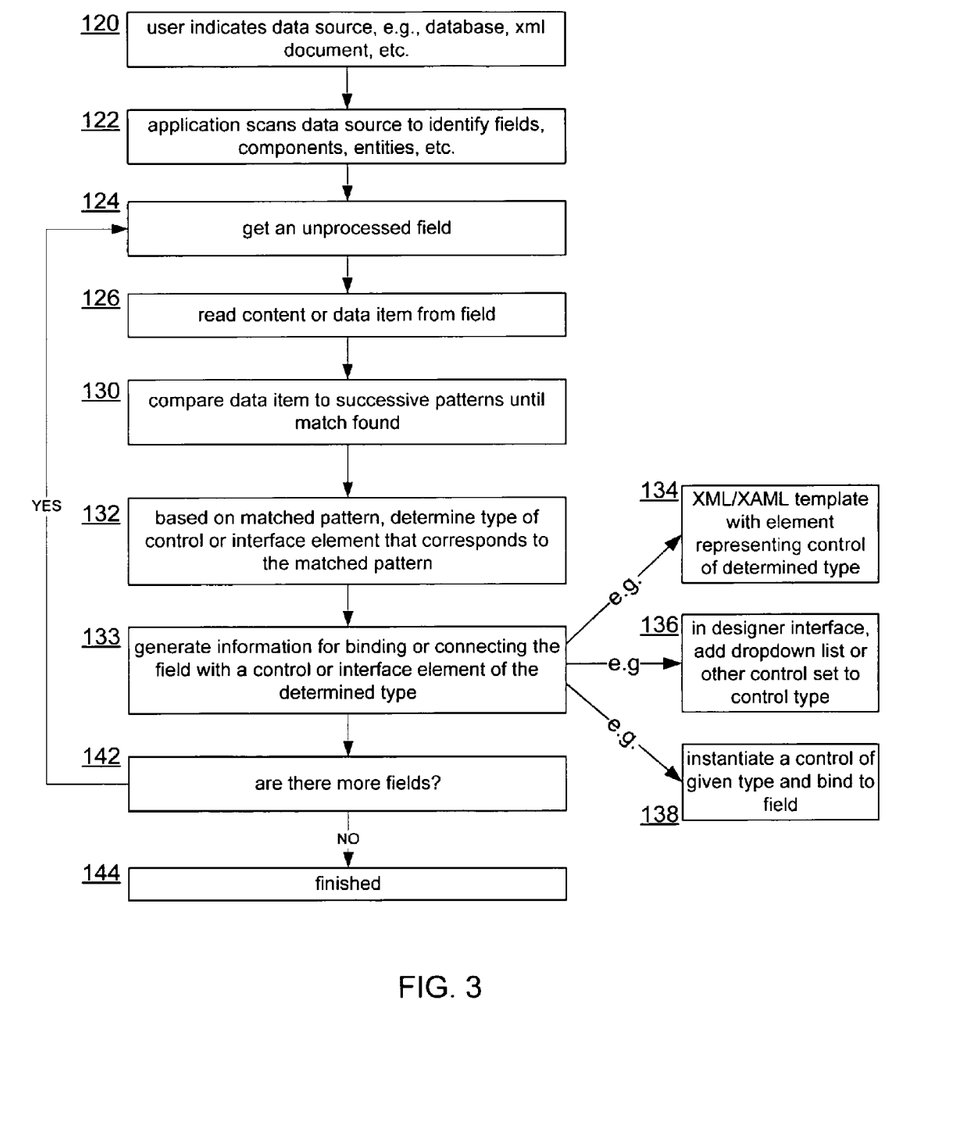
FIG. 3 shows a detailed user interface design process.

FIG. 3 shows a detailed user interface design process. The user selects or indicates 120 a data source, such as an XML document or stream, a database, or some other form of data source. The data source can be indicated 120 with a chooser-panel such as the Data Sources chooser shown at the top of FIG. 5. Assuming that the data source is established, the process scans 122 the data source to identify fields of the data source. Information about fields (number of fields, field names, a collection of fields, etc.) can be obtained, for example, from an object that wraps or presents the data source. The process then iterates through the fields by first getting 124 an unprocessed field and reading 126 content or a data item from the field. In one embodiment, the data is then analyzed 104 by comparing 130 the data item to successive patterns (see FIG. 4) until a match is found. Based on the matched pattern, a type of user interface element (e.g., textbox, button, slider, etc.) is determined 132. Preferably, a user interface element type is determined 132 implicitly by using an interface element type that is associated with the pattern; the interface element type is assumed to be the desired type of user interface element that will be used for the data item's field.

The determined 132 user interface element type is then actualized by generating 133 information for binding or connecting the field with a control or interface element of the determined type. As seen in FIG. 3, this information can take many different forms. For example, the generated 133 information can be an XML or XAML (Extensible Application Markup Language) template 134 that expresses an object model using XML (see FIG. 8). In such a template 134, a user interface element is usually represented or declared by a corresponding type of XML element. The generated 133 information can also be in the form of a user interface 136 for designing a view (user interface, interface layout, etc.), and more specifically, default settings of controls that can be used at design time to select different types of user interface elements (see the top interface in FIG. 6). The generated 133 information can also be an actual instance 138 of a control or element of the determined type, bound to the gotten 124 field. In other words, the process of FIG. 3 can be used at runtime to dynamically generate and bind user interface elements to the data source. These should not be considered the only ways of generating 133 user interface information.

To iterate through all of the fields that will be processed, the process checks to see if there are 142 more fields. If there are, the process is repeated until there are no more fields to process, at which point the process is finished 144.

Regarding the processes in FIGS. 2 and 3, it should be noted that the general idea of analyzing content for user interface design can be used to chose user interface element properties as well as, or instead of, types of user interface elements. That is to say, other embodiments analyze data items from a data source to automatically select the user interface element properties to bind to fields in the data source. This technique is discussed in more detail later.

Figure 4:
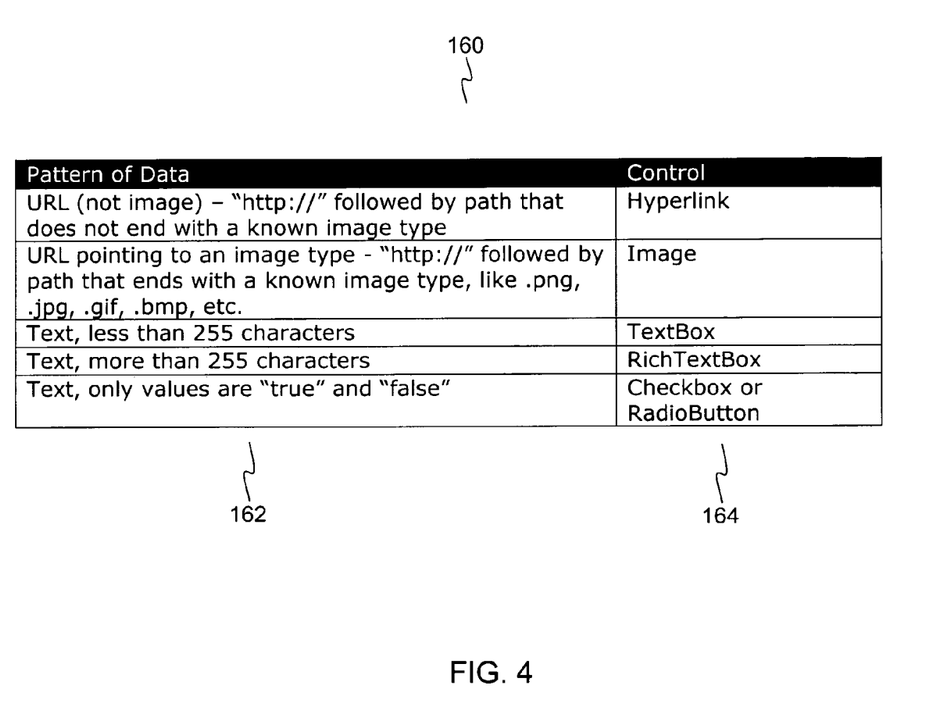
FIG. 4 shows an example table of patterns for analyzing content or data items from a data source.

FIG. 4 shows an example table 160 of patterns for analyzing content or data items from a data source. Table 160 has a column containing patterns 162 that can be compared to data items. Table 160 also has a column containing user interface element types that correspond to the patterns 162. It will be appreciated that the examples in table 160 are not limited. Furthermore, the table 160 can be extended to include a column that identifies preferred user interface element properties associated with respective patterns. It should also be noted that a table is only one of many ways that content can be analyzed. Any heuristic or algorithm can be used to map data items to different types or properties of user interface elements. Also, the patterns 162, whether in a table or in a coded algorithm, can be conveniently implemented using regular expressions. The table 160, or other pattern-interface mapping, can be predefined, driven by context or information about the data source, or even modified by a user. Furthermore, more than one data item can be used to analyze a field. For example, many data items could be analyzed for a field, and the most commonly matching pattern can be used as the matching pattern for that field. Or, if an empty data item is found, other data items for the field can be read until a non-empty item is found.

Figure 5:
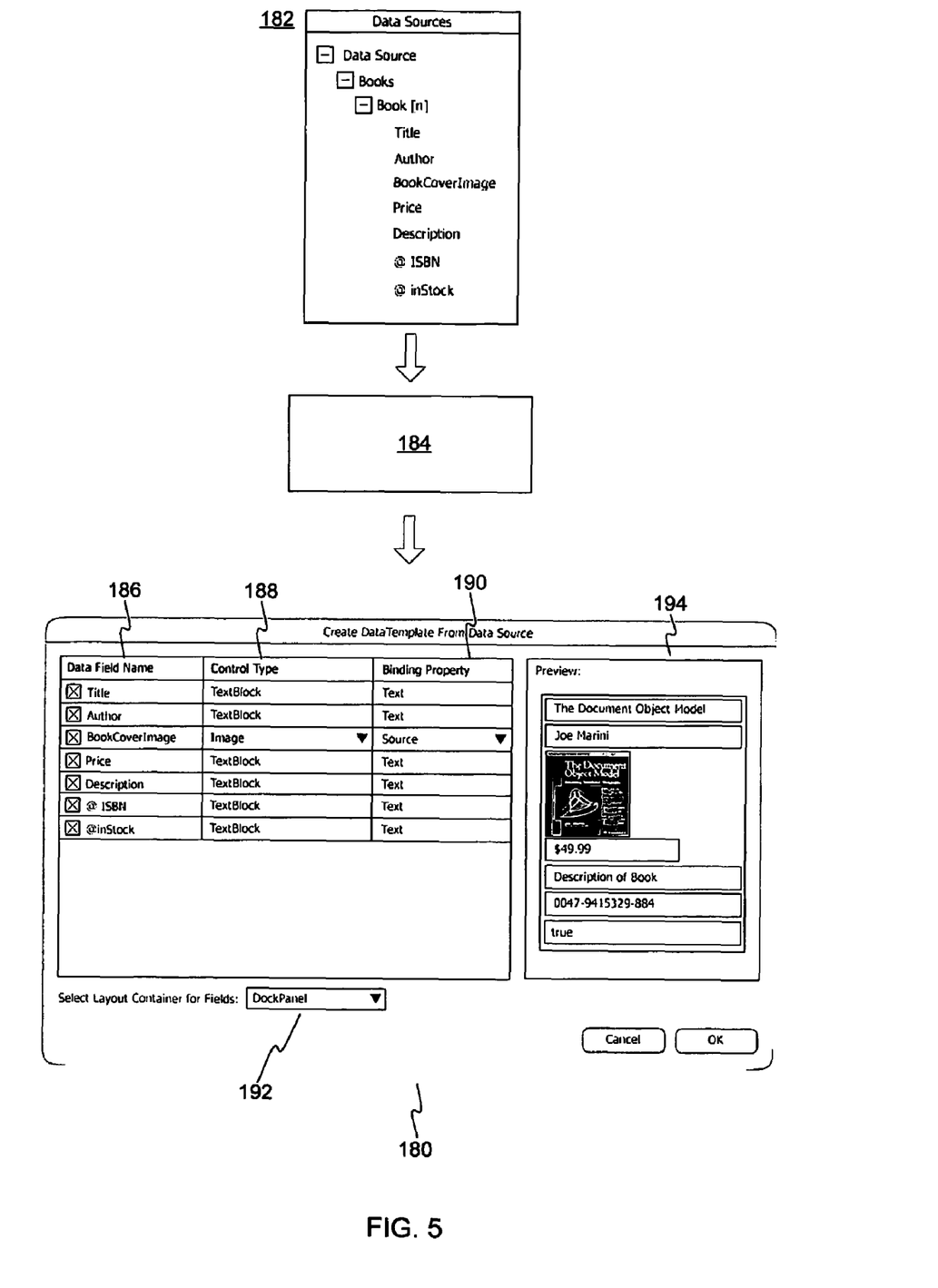
FIG. 5 shows how content analysis can be used to configure a user interface design tool.

FIG. 5 shows how content analysis can be used to configure a user interface design tool 180. A user may be presented with a data source selection panel 182, with which the user may indicate 120 a data source which can be acquired 100. Box 184 represents behind-the-scenes logic, such as the process in FIG. 3, for generating the design tool 180. The design tool 180 is generated to have identifiers 186 (e.g. labels, checkboxes, etc.) that correspond to fields in the data source. If the identifiers 186 are checkboxes, their selection controls whether the field is to be included in the final user interface that is being designed.

Figure 6:
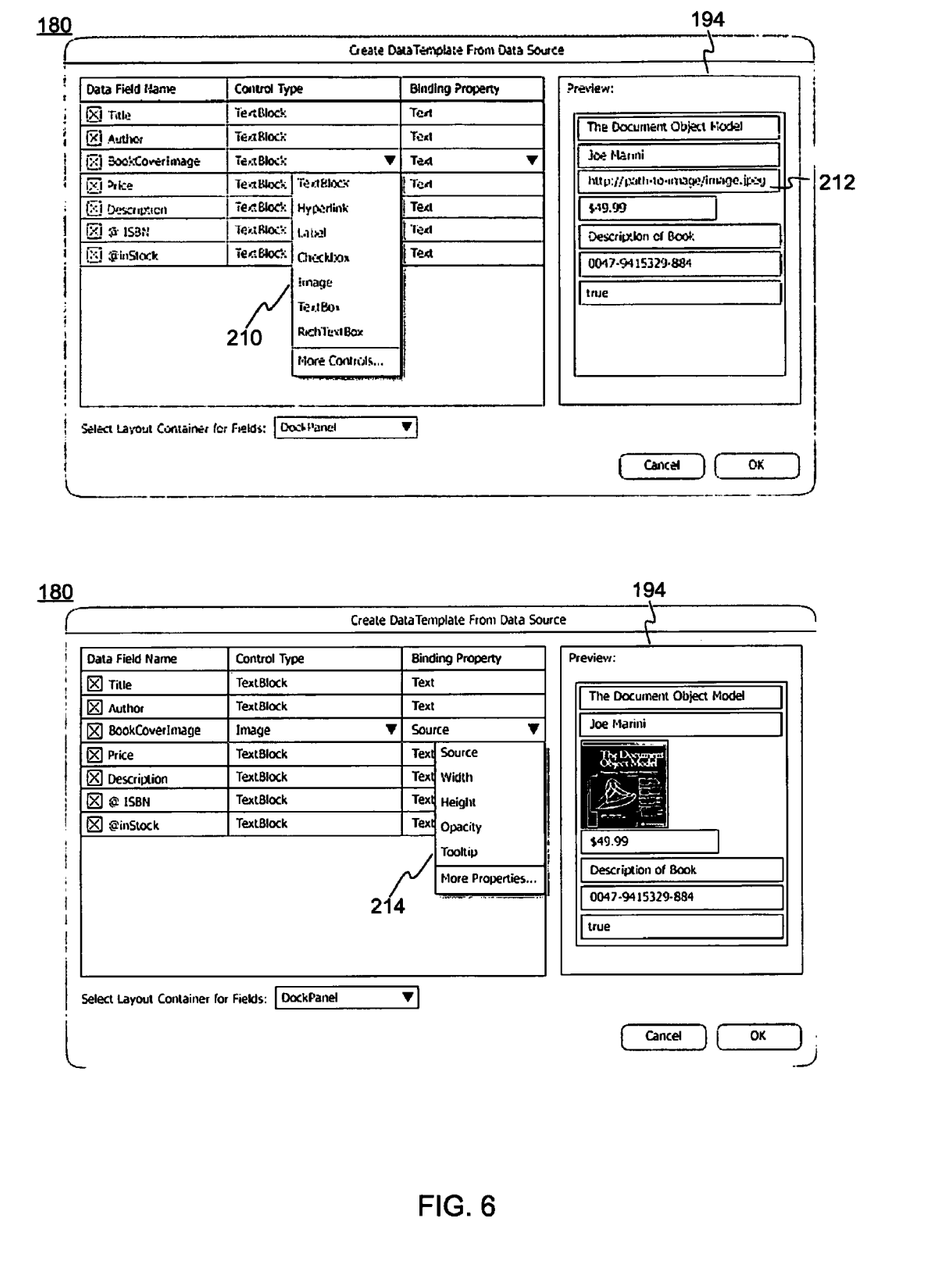
FIG. 6 shows how designators can be used to design a user interface.

The design tool 180 is also provided with designators 188, which are any kind of user interface elements that a user can interact with to select or designate different types of user interface elements desired to be bound to the corresponding fields. The design tool 180 alternatively, or additionally, is provided with property designators 190 for designating properties of user interface elements that are desired to be bound to fields. In this example, the designators 188 and 190 are dropdown lists, as shown in FIG. 6. The default designations of user interface element types and/or properties of the designators 188, 190 are set in accordance with content analysis in a manner similar to that of FIG. 3, and in particular steps 132, 133, and 136. For example, assuming that the "BookCoverImage" field's data item matched to the Image control pattern (see FIG. 3), the designator for that field is set to a default user interface element type of "Image".

The user interface design tool 180 may also have a layout container selector 192 for selecting a type of layout container that will be used to contain the user interface elements upon completion of the interface design. For example, a stack or grid layout container can be selected. The type of container affects how the user interface elements are laid out or arranged. As seen in FIG. 5, selection of a DockPanel container results in a layout as seen in preview area 194. The preview can change in accordance with changes to the selected container class.

FIG. 6 shows how designators 188 and/or 190 can be used to design a user interface. As seen in the top part of FIG. 6, a designator 188 (dropdown list 210) for the "Control Type" can be used to change the control or user interface element type to something other than the default. Note that in the upper example changing the control type for the "BookCoverImage" field to "TextBlock" results in a change in the preview area 194: the user interface element 212 is now a TextBlock type control and is displayed accordingly. In the lower part of FIG. 6, a designator 190 (dropdown list 214) is used to change a property to which the corresponding field will be bound. If the type of user interface element control for a field is changed with a designator 180 or dropdown list 210, then the properties for that field that are available for selection with designator 190 or dropdown list 213 will also change. For example, the items listed in dropdown list 214 will change.

Figure 7:
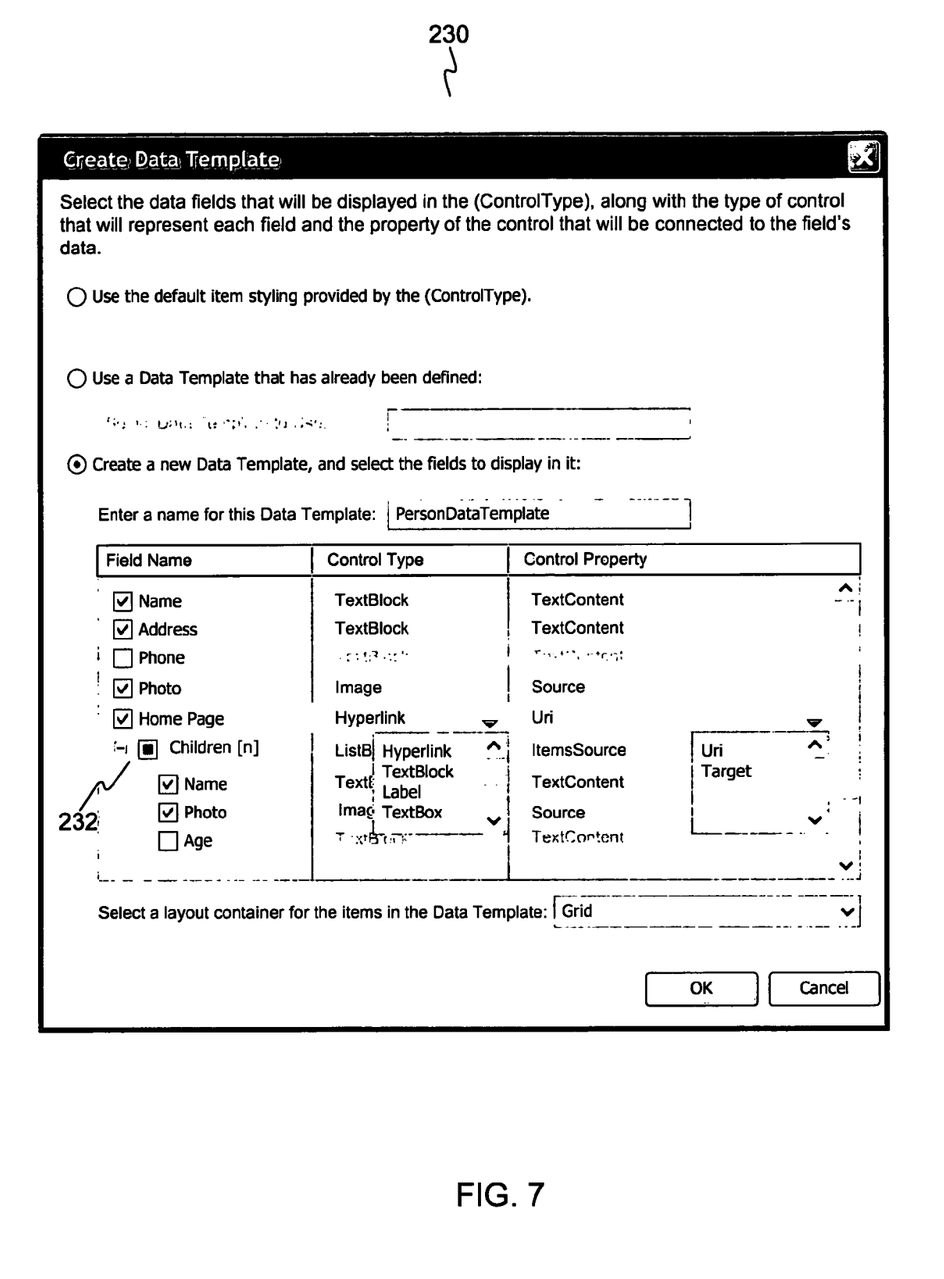
FIG. 7 shows another form of user interface design tool.

FIG. 7 shows another form of user interface design tool 230. Fields or elements of a data source can be nested or hierarchical. Therefore, this example shows that the designators 188, 190 can also be nested. For example, if the "Children" field 232 has subfields such as "Name", "Photo", and "Age", these subfields can also have corresponding designators 188 and corresponding user interface elements (per their designators) in the preview area (not shown).

Figure 8:
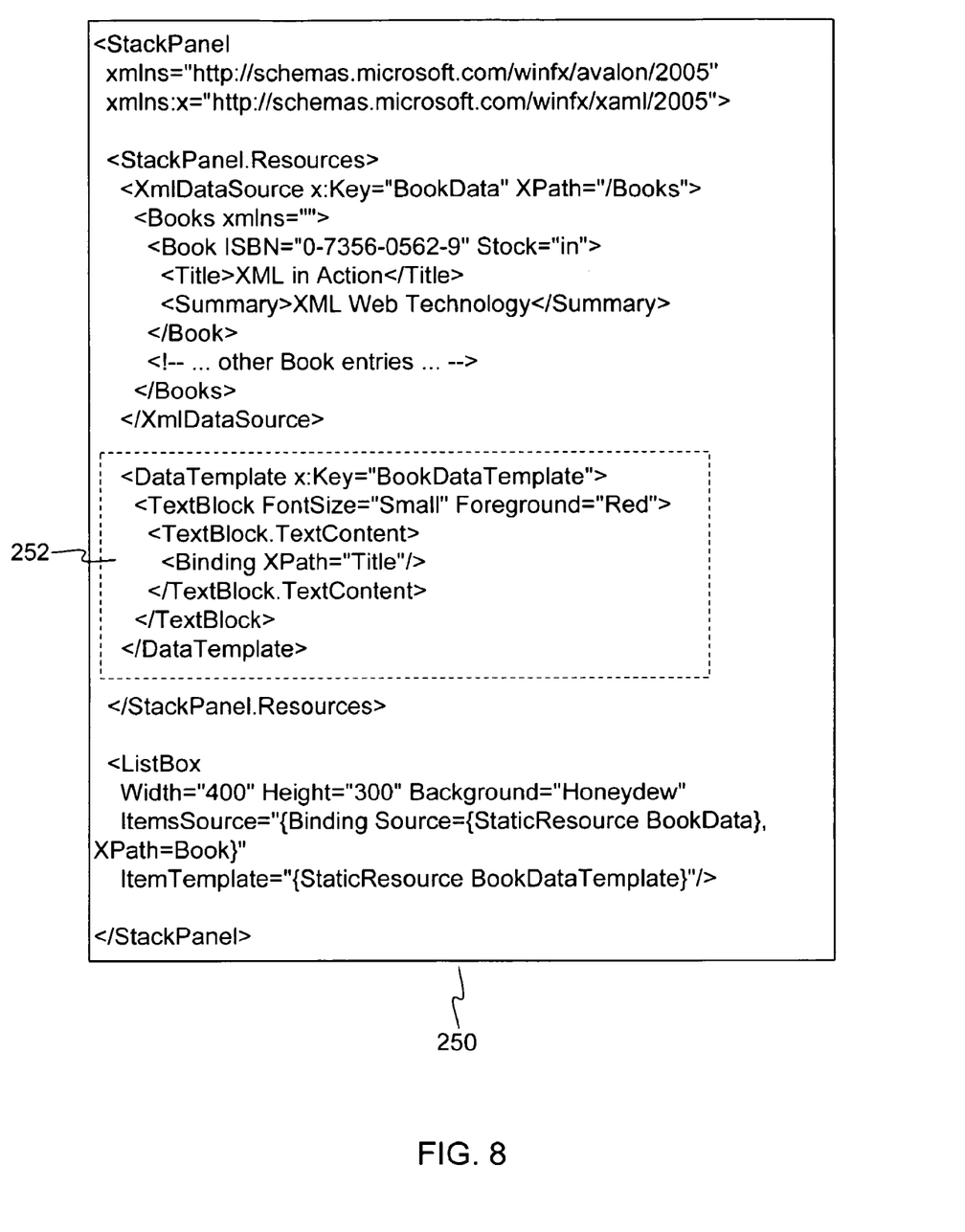
FIG. 8 shows an example of information, in this case an XAML (Extensible Application Markup Language) document, which can be generated for binding a user interface to a data source.

FIG. 8 shows an example of information, in this case an XAML (Extensible Application Markup Language) document 250, which can be generated for binding a user interface to a data source. The user interface design tool is configured to ultimately produce some information that can be used to display and run the designed user interface. As mentioned with reference to FIG. 3, this information can take many forms. However, with the availability of declarative user interface technology such as XAML (Extensible Application Markup Language), based on XML, full blown source code is not needed to define a user interface and its binding to a data source.

XAML allows separation of the presentation layer code from application logic. XAML is a language for user interface programming. XAML allows a developer to control the layout of application interfaces including text, graphics, buttons, and user interface controls. Each XAML tag corresponds directly to an interface class. A new button, for example, can be created by using a <Button> tag in an XAML file. The tag instantiates a Button object using the default constructor and allows setting of properties of the button, such as text label, size, etc. XAML code can be used by a runtime language environment, a compiler, etc.

As can be seen in document 250, template information 252 can be used to define user interface elements (e.g., a TextBlock element), and those elements can be bound to parts or fields of a data source (e.g., the "Title" field of the "BookData" data source). The template information 252 can be in a separate file generated by the design tool. The output of a design 180/230 can take other forms as well, such as actual instantiation of a user interface, generation of source code, and so on.

In conclusion, those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

The invention claimed is:

1. A method, performed by a processor of a computer, of selecting a type and property of a user interface element to be associated with a data source field, the method comprising:

accessing a data source, the data source comprising a plurality of fields, each field containing data;

automatically analyzing, by the processor, the data in each field to determine the type of the data;

for each field, selecting a type of user interface element and a property of the selected user interface element to bind to the respective field based on the analysis of the data such that the type of user interface element and property of user interface element that is selected for the field is based on a type of the data in the field;

displaying, in a user interface, a table that includes a first column having a row for each field of the data source that was analyzed, a second column having a row for the user interface element that was selected to be bound to each field in the first column, and a third column having a row for the property of the user interface element that was selected to be bound to each field of the first column, wherein at least one of the rows of the first or second column displays an option for changing the user interface element or property to which the field is to be bound, and wherein the option is automatically set to a current selection based on the analysis of the data in the corresponding field;

displaying, in the user interface, a user interface control for selecting a layout container for containing each of the user interface elements that are selected to be bound to the fields being displayed in the first column; and generating an XAML document that stores the bindings of the fields of the first column to the specified user interface elements and properties in the corresponding second and third columns.

2. A method according to claim 1, wherein the analyzing comprises comparing the data items to predetermined patterns that are associated with the types of user interface elements.

3. A computing device configured to perform a method according to claim 1.

4. Volatile or non-volatile computer-readable media storing information for a computer to perform a process, the process comprising:

designating a data source to be bound to a user interface for displaying and manipulating data obtained from the source, the data source comprising fields containing content;

accessing the data source and automatically analyzing, by the computer, the content of each field to automatically select a type of user interface element and a user interface element property to be bound to the field of the data source, wherein the selection of the type and property of the user interface element is based on a type of the content in the field;

displaying, in a user interface, a table that includes a first column having a row for each field of the data source that was analyzed, a second column having a row for the user interface element that was selected to be bound to each field in the first column, and a third column having a row for the property of the user interface element that was selected to be bound to each field of the first column, wherein at least one of the rows of the first or second column displays an option for changing the user interface element or property to which the field is to be bound, and wherein the option is automatically set to a current selection based on the analysis of the data in the corresponding field;

displaying, in the user interface, a user interface control for selecting a layout container for containing each of the user interface elements that are selected to be bound to the fields being displayed in the first column; and generating an XAML document that stores the bindings of the fields of the first column to the specified user interface elements and properties in the corresponding second and third columns.

5. Computer-readable media according to claim 4, wherein the data source comprises a database or a document comprising markup language and content identified thereby.

6. Computer-readable media according to claim 4, wherein generating the XAML document is responsive to user input.

7. A computing device comprising computer-readable media according to claim 4.

* * * * *